United States Patent

[11] 3,627,408

| [72] | Inventor | James L. Fergason<br>Verona, Pa. |
|---|---|---|
| [21] | Appl. No. | 467,852 |
| [22] | Filed | June 29, 1965 |
| [45] | Patented | Dec. 14, 1971 |
| [73] | Assignee | Westinghouse Electric Corporation<br>Pittsburgh, Pa. |

[54] ELECTRIC FIELD DEVICE
20 Claims, 10 Drawing Figs.

[52] U.S. Cl. .................................................. 353/84,
178/5.2, 250/213, 324/96, 350/160
[51] Int. Cl. ....................................................... G02f 1/16
[50] Field of Search............................................ 23/253;
350/160, 161, 160 P, 150; 250/213; 324/86;
178/5.2; 353/84

[56] References Cited
UNITED STATES PATENTS

| 3,114,836 | 12/1963 | Fergason et al................ | 350/160 P UX |
| 3,322,485 | 5/1967 | Williams........................ | 350/160 |

Primary Examiner—William L. Sikes
Assistant Examiner—Edward S. Bauer
Attorneys—F. H. Henson and C. F. Renz

ABSTRACT: An electric field sensitive device for providing a visual indication in response to an electric field incorporating liquid crystalline materials of the type exhibiting the cholesteric phase.

ELECTRIC FIELD DEVICE

This invention relates to apparatus and methods for detection and visual indication of an electric field.

In many applications, it is desirable to provide an electric field sensitive device for giving a visual indication of the fact that a field is present and also visual indication in response to a change or different values of the field thereacross. Certain organic materials have been found that modify their optical properties in response to an electric field. These materials are liquid crystalline materials of the cholesteric phase.

Liquid crystalline materials have properties that are intermediate to those of a true liquid and a true crystal. It has mechanical properties of a liquid and optical properties of a crystal. Liquid crystalline materials have also been referred to as materials in the mesomorphic state.

Liquid crystals are conventionally divided into three classes or phases. One class is the smectic structure, which is characterized by its molecules being arranged in layers with the long axis of the molecules approximately normal to the plane of the layers. A second class is the nematic structure, which is characterized by threadlike molecules that tend to be in nearly parallel orientation with their long axis. The neumatic phase does not have the molecules separated into layers. The third class of liquid crystals is known as the cholesteric phase. The molecules in the cholesteric phase substantially act as though they are arranged in layers. These layers are very thin with the long axis of the molecules parallel to the plane of the layers. It is also found that the direction of the long axis of the molecules in each layer is displaced slightly from the corresponding direction in adjacent layers. The term cholesteric was chosen because the molecular structure is characteristic of a large number of compounds that contain cholesterol. Cholesterol by itself does not have a liquid crystal phase. The present invention is concerned with materials exhibiting a cholesteric liquid crystalline phase.

The unique molecular architecture of the cholesteric liquid crystals give rise to a number of optical properties which differ from the smectic or nematic phase. The characteristic properties of the cholesteric structure may be summarized as follows:

1. It is optically negative, while smectic and nematic structures are optically positive. An optical negative layer provides that light entering perpendicular to the molecular layers has a maximum velocity.
2. The structure is optically active. If linearly polarized light is transmitted perpendicularly to the molecular layers, the direction of the electric vector of light would be rotated progressively to the left along the helical path. Thus the plane of polarization, which is determined by the electric vector in the direction of propagation, will be rotated to the left, to an angle that will be proportional to the thickness to the transmitting materials. The magnitude of the rotation of the plane of polarization is also a function of the wavelength input. This property may be referred to as wavelength dependent optical activity.
3. It selectively scatters light directed onto the molecular structure. The term scattering is used rather than reflection in order to distinguish from the effect occurring on a mirror surface wherein light is reflected at an angle equal to the angle of incidence. A scattered light ray may leave the scattering material at an angle unrelated to the angle of incident light. A selectively scattering film when observed with light impinging on the film from the same side as that which is viewed, has an apparent color which is the complement of the color of the light transmitted by the film. That is, the light scattered from the film is within a wavelength band which, if added to the light transmitted through the material, would form white light, if white light was incident on the film. The terms light and color as used herein have a broad connotation of referring to electromagnetic radiation generally, rather than to solely visible radiation. Most materials do not selectively scatter light in that light transmitted through them is not complementary to light scattered by them but rather is within the same wavelength band. The difference in effect between selectively scattering materials and ordinary materials is believed due to the fact that in ordinary material some light is absorbed by electron photon interaction while in selectively scattering materials there is very little absorption. A cholesteric material exhibits a scattering peak having a narrow bandwidth over the electromagnetic spectrum. The bandwidth in the visible spectrum is about 200 angstroms. The phenomena of selective scattering as exhibited by cholesteric liquid crystal films is independent of whether the light illuminating the film is polarized or not. This is the property that gives the iridescence appearance of the material under ambient light.
4. Another optical property exhibited by the cholesteric liquids is circular dichroism. When ordinary white light is directed onto cholesteric material, the light is separated into two components, one with the electric vector rotating clockwise and the other with the electric vector rotating counterclockwise. Depending upon the material, one of these components is transmitted and the other is scattered. This gives the property of circular dichroism or the selective scattering of right or left-hand circularly polarized light.
5. Another property is that when circularly polarized light is directed onto cholesteric materials, the sense of polarization of the scattered light is unchanged from the incident light.
6. The mean wavelength of the scattering bank depends upon the angle of incidence of the light. The type of material and the temperature also affect the mean wavelength of the scattering band.

The molecular structure of a cholesteric liquid crystal substance is very delicately balanced and can be easily upset. Thus any small disturbance that interferes with the weak forces between the molecules and produces marked changes in such optical properties as scattering, transmission, birefringence, circular dichroism, optical activity and color.

One of the most striking optical transformations that occurs in certain cholesteric substances is in response to changes in temperature. Although most cholesteric substances are colorless as liquids, they pass through a series of bright colors when they are cooled through their liquid crystal phase. All cholesteric liquid crystals do not respond in the same way to fluctuations in temperature. The colors may vary and the sequence of colors with cooling may vary. It is also possible to obtain certain materials that have very little reaction at all to changes in temperature. The properties of the liquid crystal materials of the cholesteric phase with regard to response to thermal changes is discussed in U.S. Pat. No. 3,114,836.

Another effect that has been noted with certain cholesteric liquid crystals is its response to certain chemical vapors. The addition of extremely small amounts of certain chemical vapors can change the basic molecular structure and thereby affect the optical properties, such as the selective scattering effect. This application is more thoroughly discussed in the copending application Ser. No. 323,341 now U.S. Pat. No. 3,409,404, filed Nov. 13, 1963 and assigned to the same assignee as the present invention. A review of certain existing knowledge of liquid crystalline materials is found in the book MOLECULAR STRUCTURE AND THE PROPERTIES OF LIQUID CRYSTALS by G. W. Gray, copyright 1962, published by Academic Press Inc., New York, N.Y.

It has now been discovered, and it is on this discovery that the present invention is in a large part predicated, that electrical fields can affect the structure of cholesteric liquid crystals so that one or more optical properties thereof is change. Such a liquid crystal device may be utilized for detection of a field with an indication by color of the value of a voltage or a current impressed thereon. In addition, the liquid crystal device may be utilized for display of a visual image. A variety of devices may be constructed to bring about and utilize this phenomenon. The optical property most readily utilized in the practice of this invention is that of selective scattering since it does not require polarization for observation. The change in transmission properties of light through the liquid crystal device may be utilized and controlled. This transmission shift is in the same direction and to the same extent as the scattering band.

It is accordingly the principal object of this invention to provide a device for detection of an electric field.

It is another object to provide a light modulation device in which the optical properties are modified in response to an electric field.

It is another object to provide a device for detection and indication of the strength of an electric field.

It is another object to provide a device for color indication of an electric field.

It is another object to provide a device for visual indication of operation of a low-voltage circuit.

It is another object to provide a high-impedance voltage indicator.

It is still another object to provide a method of visually indicating an electric field.

It is another object to provide an image display screen in which the wavelength of light scattered by the screen may be varied by application of electric field so as to change the scattering properties of the screen from one visible color to another visible color.

It is another object to provide a display device in which applications of an electric field to a liquid crystal material of the cholesteric phase provide a visual image representative of the electric field applied to the liquid crystal.

It is another object to provide an improved color television system.

Briefly, the present invention accomplishes the above cited objects by providing an element including a liquid crystal material of the cholesteric phase, means for applying an electric field thereacross to modify the optical properties thereof and means for detecting and presenting the change in optical properties of the liquid crystal material.

Further objects and advantages of the invention will become apparent as the following description proceeds and features of novelty which characterize the invention will be pointed out in particularity in the claims annexed to and forming a part of this description.

For a better understanding of the invention reference may be had to the accompanying drawings in which.

Figure 1:
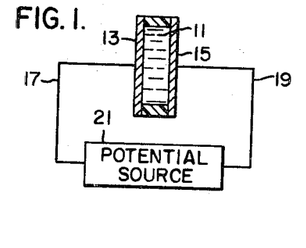
FIG. 1 is a diagrammatic view of an electric field sensitive device in accordance with the teachings of the invention.

Referring to FIG. 1, there is illustrated a simplified voltage sensitive device including a layer 11 of a mixture of liquid crystalline materials of the cholesteric phase that exhibit a change in optical properties in response to an electric field impressed across the layer 10. It is found that liquid crystal materials of the cholesteric phase exhibit a change in optical properties in response to an electric field impressed across the layer 10. It is found that certain liquid crystal materials of the cholesteric phase including from 15 to 50 percent of cholesterol, cholestanol, sitosterol, cholesteryl halide, cholestanyl halide and sitosteryl halide. The following materials cholesterol, cholesteryl chloride, cholesteryl bromide, cholestanol, cholestanyl chloride, cholestanyl bromide, cholesteryl iodide, cholestanyl iodide, sitosterol, sitosteryl chloride, sistosteryl bromide, sitosteryl iodide or mixtures thereof provide an excellent field sensitive layer 11. The balance including sterol derivatives and up to 20 percent of fatty acids and compounds thereof. The preparation of suitable materials is described in the previously mentioned copending application Ser. No. 323,341. The mixture of layer 11 specified are relatively insensitive to thermal excitation.

The following Table gives a listing of specific mixtures of materials by percent weight which exhibit the field effect. These materials are stable at room temperature.

TABLE II

| Mixture | Color at Room Temperature |
| --- | --- |
| 20% Cholesteryl Chloride (CC) 80% Cholesteryl Oleyl Carbonate (OCC) | Blue |
| 25% Cholesteryl Chloride 75% OCC | Green |
| 30%CC 70% OCC | Red |
| 20% Cc 20% Cholesteryl Nonanoate (CN) 60% OCC | Blue |
| 25%CC 75% Cholesteryl Oleate (CO) 25% Cholesteryl Bromide (CB) | Green |
| 75% OCC 30% CB | Green |
| 70% OCC 25% CC 25% OCC | Red |
| 25% CO 25% CN | Green |

In FIG. 1, a suitable liquid crystal material of the cholesteric phase exhibiting the field effect such as 20 percent by weight of cholesteryl chloride with 80 percent by weight of cholesteryl oleyl carbonate. The percentage of Cholesteryl chloride may vary from 15 percent to 50 percent by weight of the mixture.

The layer 11 is sandwiched between two transparent electrical conductive layers 13 and 15. Electrical conductive leads 17 and 19 from the respective conductive layers 13 and 115 provide means of applying an electric potential illustrated as source 21.

The application of a voltage across the layer 11 by the source 21 results in a field across the layer 11. The electric field modifies the optical properties of the layer 11. These properties include optical rotation, selective scattering and selective transmission. The apparatus and the methods of visual display of these effects will be discussed with respect to the following embodiment.

Figure 2:
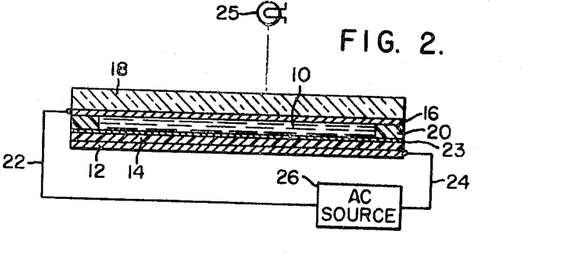
FIG. 2 is a cross-sectional elevation view of a voltage sensitive device according to the teachings of the invention.

Referring to FIG. 2 there is illustrated a voltage sensitive device including a liquid crystalline material of the cholesteric phase. This device utilized the selective scattering properties of the liquid crystalline layer. The device consists of a layer 10 of suitable liquid crystal materials, for example a layer consisting of 45 percent by weight of cholesteryl bromide, 30 percent cholesteryl oleate and 25 percent cholesteryl nonyl-phenyl carbonate. This layer 10 when illuminated by white light, which provides uniform intensity over the spectrum, exhibits properties as best illustrated by the curves in FIGS. 3 and 4.

The electric field sensitive device illustrated in FIG. 2 consists of a layer 12 of a suitable electrically conductive layer of a material such as aluminum, a layer 14 of a suitable insulating material such as aluminum oxide, a suitable black coating 23 of a suitable dye, the layer 10 of a suitable liquid crystalline material, a layer 16 of a suitable electrical conductive material transmissive to visible light of a suitable material such as stannic oxide and a support layer 18 of a suitable material transmissive to visible light such as glass and supporting the layer 16. The function of the layer 14 is to provide a carrier for the light-absorbing layer 23 and to insure against electrical breakdown of the cell. In some applications, the layers 14 and 23 could be omitted.

The specific device shown in FIG. 2 may be constructed by providing a sheet of commercial grade aluminum of about 0.5 inch in thickness. The sheet of aluminum may be of any desired dimensions, such as about 3 inches in diameter. The sheet of aluminum may be cleaned in an aqueous solution of ammonium nitrate 3 percent by weight and anodized to provide the desired thickness of aluminum oxide by the adjustment of voltage. An electrode of lead may be utilized for the cathode in this operation. By this procedure an aluminum oxide coating 14 of a desired thickness of about 1 micron is formed on both surfaces of the aluminum sheet simultaneously. The anodized aluminum sheet is then removed from the electrolyte and washed in distilled water and then pure acetone. Next, the anodized layer on one side of the aluminum layer 12 is removed by treatment with a suitable caustic reagent, such as sodium hydroxide. After the sodium hydroxide has had an opportunity to act on one of the aluminum oxide films, the aluminum may be washed in distilled water and the aluminum oxide film on one surface of the aluminum layer 12 is removed leaving the other layer 14 of aluminum oxide. The resulting structure provides an aluminum oxide layer 14 of a thickness of about 1 micron and a suitable electrical conductive layer 12 of aluminum of a thickness of about 0.5 inch. The aluminum oxide layer 14 is then treated with a suitable dye to provide a black coating 23 for light absorption.

The other electrically conductive electrode 16 is provided by evaporating a coating of a suitable material such as stannic oxide to a thickness of about 0.1 micron onto a substantially transparent sheet of glass of a suitable material such as pyrex and of a thickness of 0.125 inch. An annular spacer 20 of a suitable electrically insulating material such as polyethylene terephthalate is positioned on the aluminum oxide surface and the liquid crystalline material is deposited on the coating 23. Since this liquid crystalline material is in liquid form, the material may be squeezed onto the surface from a container, applied by a dropper, painted or by other means applied onto the exposed surface of the layer 13. The other electrode 16 is then positioned over the liquid crystalline layer 10 and the structure may be sealed by a suitable sealing compound such as epoxy to mechanically secure the structure.

Electrode leads 22 and 24 connected respectively to the layer 16 and the layer 12 are connected to a voltage source 26. A suitable light source 25 such as a tungsten filament light source is provided to illuminate the liquid crystalline layer 10 through the substantially transparent layers 16 and 18 with white light. It should be noted that ambient lighting can provide this white light illumination or at least supplement.

Figure 3:
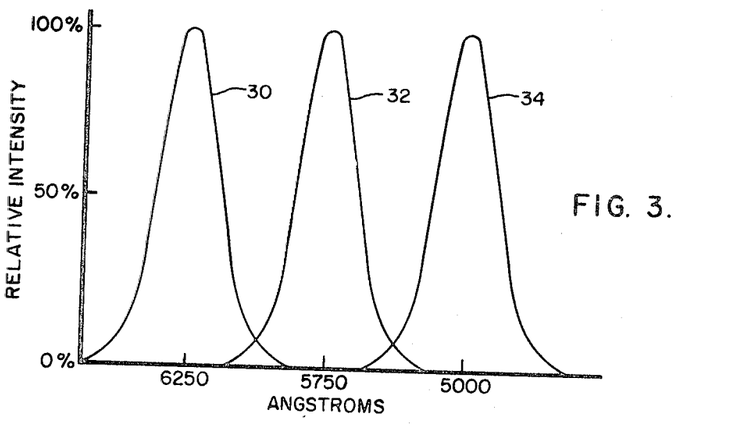
FIG. 3 is a graphical representation illustrating certain operating characteristics of the device shown in FIG. 2.
Figure 4:
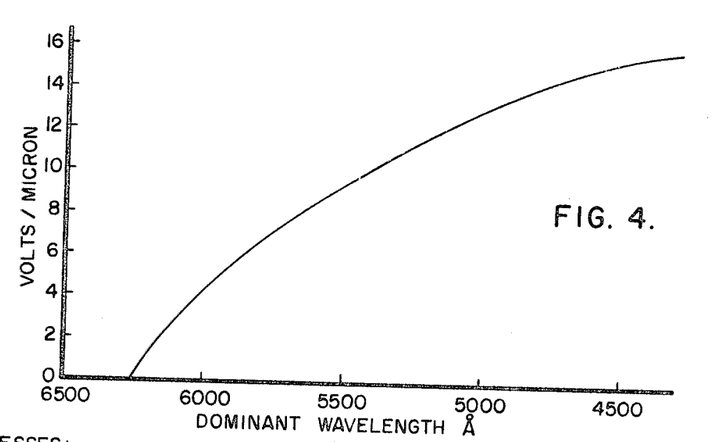
FIG. 4 is a graphical representation illustrating other operating characteristics of the device shown in FIG. 2.

Referring to FIG. 2, on application of potential across the layer 10 by means of a voltage source 26 the light from the source 25 will be selectively scattered back from the layer 10 in accordance with the voltages applied. For example, as illustrated in FIG. 3, with no voltage or a very small voltage from source 26 applied, light will be scattered from the liquid crystalline layer 10 to give a red color to an observer as illustrated by curve 30. With a field of about 6 volts per micron applied across the liquid crystalline layer 10 the light scattered from the liquid crystalline film 10 will be in the range as indicated by curve 32 so as to give off a green light. On application of a higher voltage of about 12 volts per micron light will be scattered from the liquid crystalline layer 10 so as to give a blue color and in the range indicated by curve 34. The bandwidth of scattering is about 200 angstroms. In FIG. 4, there is a plot of the dominant wavelength of scattering with respect to the electric field for the device shown in FIG. 2.

Figure 5:
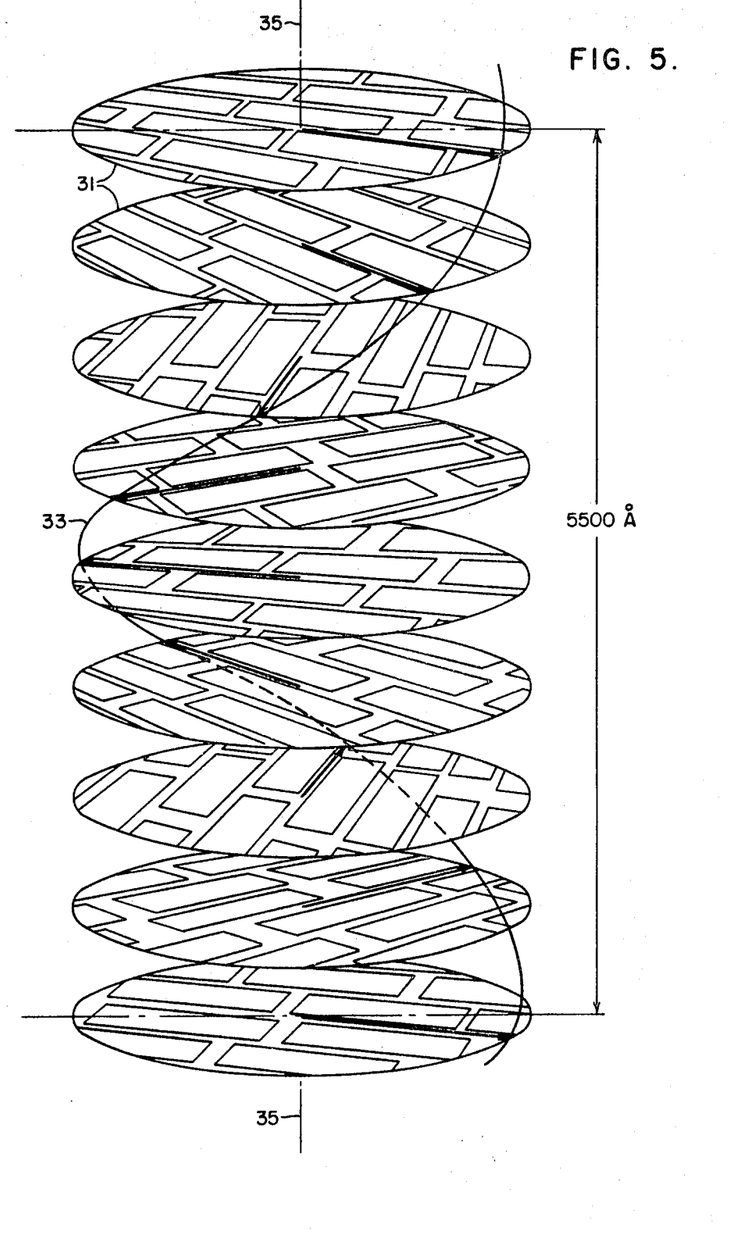
FIG. 5 illustrates the molecular arrangement within a cholesteric liquid crystal.

The molecular structure of the layer 10 is illustrated in FIG. 5. The molecules are arranged in layers 31 substantially with the molecules within each layer oriented in parallel alignment. The molecular layers 31 are very thin with the long axis of the molecules parallel to the plane of the layers. Because of the peculiar shape of the cholesteryl molecules, the direction of the long axis of the molecules in each layer 31 is displaced slightly from the corresponding direction in the adjacent layers. The overall displacement traces out a helical path as indicated by the line 33. In FIG. 5, about every 300th layer is illustrated. The line 35 is the optical axis of the crystal. It is found that when selected liquid crystals are placed in an electric field parallel to the direction of alignment or optical axis, the wavelength of maximum scattering or color will be shifted from long wavelengths to short wavelengths that is from red toward blue. The effect appears to be associated with substituted sterol molecules containing polar functional groups.

Another suitable mixture that may be used in FIG. 2 is one consisting of 27 percent cholesteryl chloride and 73 percent cholesteryl oleate. In the absence of any electric field and at room temperature 28° C. ± 15° C., this material is yellowish-green appearing at normal incidence of white light. When placed between the conducting electrodes 14 and 16, the color will change from yellow-green to blue as the electric field is increased. For example with a sample 20 microns thick, this change occurs between 0 and 100 volts or the range of color occurs over 0 to 5 volts per micron. This material has a resistivity in excess of $10^{12}$ ohms centimeters so that a charge may be placed across this material which will maintain a steady state field, the liquid crystal material behaving as a dielectric of a capacitor. The energy estimated to change the color a maximum amount is less that $10^{-6}$ joules per square centimeter for a 20 micron thick sample.

It is found that such a device as illustrated in FIG. 2 is usable as a bolt meter, having a very high impedance in excess of 500 megohms. It can also store charge for several seconds thus retaining its color once charged. By placing an AC field on the material, it was found that the liquid crystal could change its color at a rate in excess of 20 cycles per second indicating a response time as fast or faster than the human eye. Further, it has been shown that only fields in the direction of the liquid crystal axis are effective, thus making very high definition possible. That is, if two areas of charge are very close together only that part of the fields which are in the normal direction parallel to the optical axis will have an effect on the liquid crystal, thus improving resolution. It is estimated that the resolution of a 20 micron thick film would be in excess of a thousand lines per inch. The properties of this device make this material ideally suited to a number of high resolution and fast display systems. The material is ideally matched with an electron beam since both are of very high impedance.

Figure 6:
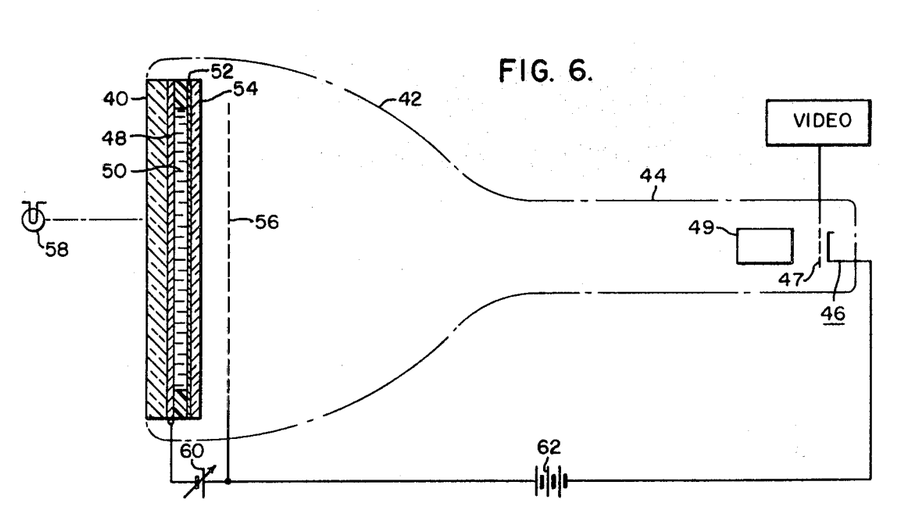
FIG. 6 is a view in sectional elevation of a display storage tube according to the teachings of my invention.

In Fig. 6, there is illustrated a storage tube incorporating a liquid crystal display screen. The storage tube is of suitable design and consists of a face plate portion 40, a flared portion 42 and a neck portion 44. An electron gun 46 is provided within the neck portion 44 of the envelope. The electron gun 46 may be of suitable design for providing a pencillike beam and is known in the art. The video signal may be applied to a control grid 47 of the electron gun 46. A coating 48 of electrically conductive light transmissive material such as stannic oxide is provided on the inner surface of the face plate 40. A layer 50 of liquid crystalline materials of a mixture such as described with respect to FIGS. 2, 3 and 4 is provided on the electrical conductive coating 48 and of a thickness of about 25 microns. Provided on the inner surface of the liquid crystal layer 50 is a layer 54 of dielectric material having a black coating 52 provided on the surface facing the liquid crystal layer 50. The dielectric may be of a suitable material such as glass or mylar (polyethylene terephthalate). The thickness of the mylar layer 54 is about 6 microns. Provided between the screen structure and the electron gun 46 is an electrically conductive mesh 56. A suitable light source 58 of white light is provided exterior of the envelope for illuminating the screen assembly including layer 50. A suitable voltage source 60 is provided between the conductive coating 48 and conductive mesh 56 and a voltage source 62 is connected between conductive mesh 56 and the cathode of the electron gun 46. The potential of the source 60 may be about 0 to 200 volts and the potential of the source 62 may be about 500 volts to 15 kilovolts.

During the operation of the device, an electron beam of several hundred volts is directed onto the surface of the dielectric layer 54 and generates a charge pattern at the surface corresponding to the video intelligence applied to the grid 47 of the electron gun 46. Suitable deflection means 49 are provided for scanning the electron beam over the screen. The charge pattern may be established by secondary emission and the surface will tend to approach the potential of the conductive mesh 56. If it is desired to write in a negative direction then the conductive mesh 56 would be operated at a sufficiently negative potential by control of voltage source 60 and the secondary electrons emitted from the dielectric surface will be returned thereto. The beam current in this case will determine the amount of charging. It is also possible to operate with the dielectric member at a more negative potential than the mesh 56 in which case the writing will be a positive direction. In this case, the electron beam will cause the emission of secondary electrons which will be collected by the mesh 56. This tube will be able to hold a charge for long periods of time thus displaying the charge or electric field image established on the dielectric surface. The charge established on the dielectric surface will establish an electric field across the liquid crystal layer 50 and vary the color of the scattered light from the source 58 in a similar manner as described with respect to FIGS. 2, 3 and 4.

The charge image may be erased by changing the potential on the mesh 56 and flooding the target with electrons from the gun 46 or by a separate flood gun. This device will provide fast write time and long storage capability. The screen may be viewed in high ambient light conditions such as in an aircraft. Since the material has the property of scattering the light incident thereon, the brighter the ambient light the brighter the display will be on the display screen. It is, of course, obvious that any means of providing a charge image on the dielectric layer 54 will be successful in displaying a color image with the color dependent upon the magnitude of electric field. A plurality of horizontal and vertical conductors with associated switches could be used in a well-known manner. It is also possible to provide a single color on black background by using a monochromatic light source. Several colors could be presented by providing a plurality of monochromatic light sources of different colors. A white source with selective filters could also be utilized.

Figures 7, 9:
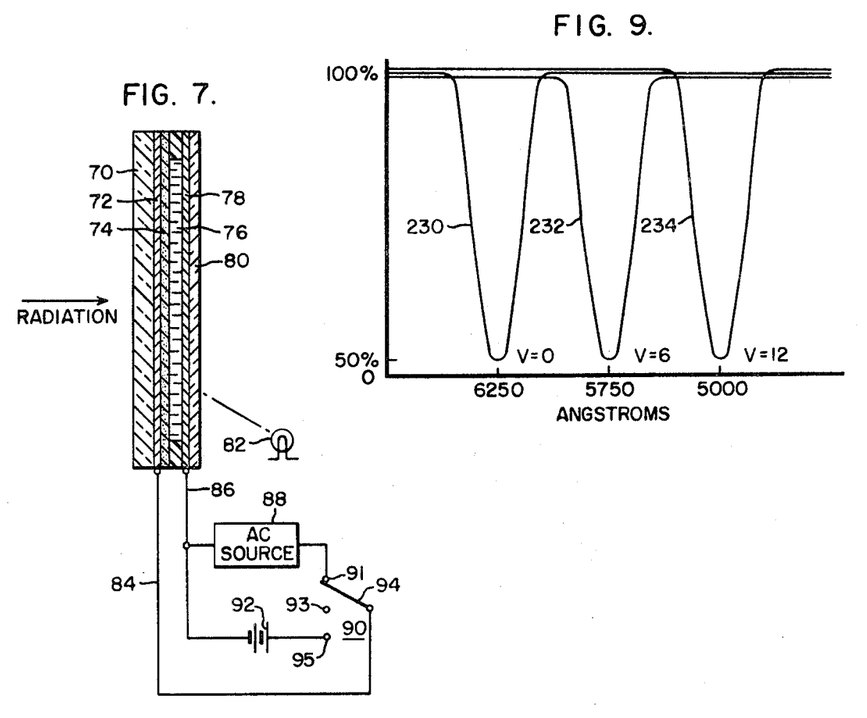
FIG. 7 is a view in sectional elevation of an image converter tube according to the teachings of my invention
FIG. 9 is a graphical representation illustrating certain operating characteristics of the device shown in FIG. 10.

Because of the extremely low power need to activate the liquid crystal material, several other devices not related to electron beam writing can be adapted to use liquid crystals. The material exhibits the ability to respond in the same manner independent of the polarity of the field. In FIG. 7, a radiation image converter is illustrated. The radiation-sensing device illustrated in FIG. 7 consists of a glass support member 70 having an electrical conductive coating 72 of a suitable material such as stannic oxide thereon. The layers 70 and 72 are of a material transmissive to the radiation input. A layer 74 of a suitable photoconductive material sensitive to input radiations such as cadmium sulfide in the case of visible light is deposited on the conductive coating 72. A layer 76 of a suitable liquid crystal material exhibiting field effects and of similar material as used in layer 10 of FIG. 2, is deposited on the photoconductive layer 74. An electrical conductive coating 78 of a material such as stannic oxide is provided on the liquid crystal layer 76 and a support member 80 of a suitable material such as glass is provided on the conductive coating 78. The layers 78 and 80 are transmissive to light radiations from a source 82 which may provide illuminations of white light. It is generally desireable to utilize materials in layers 78 and 80 that are transmissive to the ambient lighting to obtain the benefit of this illumination also. Lead-in members 84 and 86 are connected respectively to layers 72 and 78 for providing the necessary potential across the liquid crystal layer 76 and the photoconductive layer 74. The lead 86 is connected to the first terminal of an alternating-current source 88 with the second terminal of the source 88 connected to a (fixed contact) 91 of a switch 90.

A DC potential source 92 is connected from the first terminal of the source 88 to a fixed contact 95 on the switch 90. The lead 84 is connected to the movable member 94 on the switch 90 and may engage contacts 91, 93 or 95. In the specific embodiment shown, the contact 93 is left open.

In the operation of the device, the movable member 94 of switch 90 is connected to contact 91 and the radiation input such as visible light is directed onto the radiation detector. The photoconductive layer 74 will become conductive and form a conductivity image corresponding to the radiation image and, therefore, more voltage from source 88 will be applied across the liquid crystal layer 76. In this embodiment, the photoconductive layer 74 serves simply as a capacitance voltage divider. When the light is directed onto the photoconductive layer 74 more voltage is applied across the liquid crystal layer 76 and the optical properties of the liquid crystal will be modified in accordance with the voltage.

Here again, as previously described with respect to FIGS. 2, 3 and 4, the light source 82 may be white light. One could obtain a blue or green image on a background of red with materials used in layer 76. By proper selections of materials, one could obtain various color displays. By use of monochromatic light for the source 82, one would be able to provide a black background for color images. Since the source 88 provides an alternating voltage across the layer 76 there will be no permanent charging. In the case where the contact 95 is connected to the movable member 94 of switch 90, a direct-current field will be placed across the layers 74 and 76. When the input signal is directed onto the photoconductive layer 74 the structure will become conductive and a charge image will be established across the liquid crystal 76 and will be maintained thereon until removed by application of the source 88.

The optical effect utilized in the devices in FIGS. 2, 6 and 7 is the light-scattering property of liquid crystal materials of the cholesteric phase. It is also possible to utilize the transmission properties of the liquid crystals.

Figure 8:
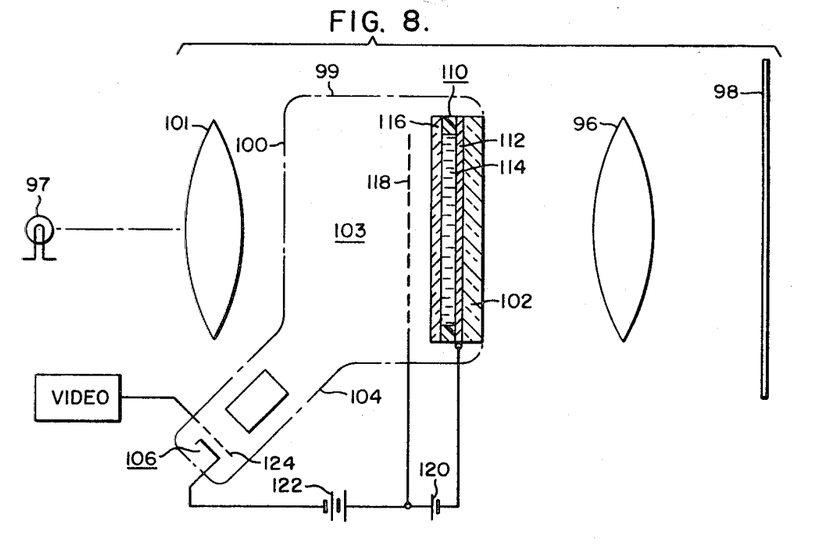
FIG. 8 is a view in sectional elevational of a projection system according to the teachings of my invention.

In FIG. 8, there is illustrated a projection system utilizing liquid crystalline materials. The liquid crystalline materials of the cholesteric phase exhibiting the field effect are largely temperature insensitive and do not absorb light. High light intensities may be controlled by an electron beam by the system shown in FIG. 8. In FIG. 8, there is illustrated a light source 97, a lens system 101, a control tube 103 and a lens system 96 for focusing the light into a viewing screen 98. The control tube 103 includes a body portion 99 with an input window 100 and output window 102. A neck portion 104 extends from the body portion 99. The input window 100 is transmissive to the radiations from light source 97 and the output window 102 is transmissive to radiation transmitted through the tube. An electron gun 106 is provided within the neck portion 104 with means for directing and scanning a raster over a light control structure 110. The light control structure 110 consists of an electrically conductive electrode 112 provided on the inner surface of the face plate 102 and transmissive to radiation passing through the output window 102. A suitable material for the layer 112 is stannic oxide. A liquid crystal layer 114 is provided on the conductive layer 112 and a radiation transmissive dielectric layer 116 is provided on the surface of the liquid crystal layer or coating 114. Here again the materials in layer 114 may be the same as those described with respect to FIGS. 2, 3 and 4. The layer 116 may be of a suitable material such as glass. The control structure 110 is similar to the screen structure shown in FIG. 2 with the omission of the black coating 52. A control grid 118 is positioned in front of the dielectric layer 116. A voltage source 120 is connected between the conductive coating 112 and the control grid 118. A voltage source 122 is also connected between the cathode of the electron gun 106 and the control screen 118. This tube operates in a similar manner to that described with respect to FIG. 6 as far as the electrostatic charge written onto the dielectric coating 116 and the establishment of a field across the liquid crystal layer 114. The video intelligence is applied to the control grid 124 of the electron gun 106. Suitable deflection means, not shown, are utilized for the deflecting of electron beam over the dielectric surface. The light source 97 is monochromatic such as red about 6,250 angstroms.

The materials in the liquid crystalline layer 114 are the same as in FIG. 2. The transmission characteristics of the layer 114 with different voltages applied are illustrated in FIG. 9. These curves 230, 232 and 234 are substantially the reverse of those of FIG. 3. By varying the voltage across the liquid crystalline layer 114, the amount of red light from the source 97 passing through the layer 114 and through the output window 102 can be controlled. As can be seen from FIG. 9, with no voltage applied the light from source 97 would be substantially scattered and only 50 percent of light would be transmitted through. As the voltage across the layer 114 is increased the layer would allow more transmission of the red light. If the light source 97 is circularly polarized then 100 percent of the light would be reflected at 6,250 angstroms.

It is also obvious that other monochromatic light sources could be utilized such as green and blue to take advantage of the nontransmissive portions or curves 232 and 234 of the layer 114 in these regions. It is, therefore, possible to provide a multicolor projection television system in which a separate system, as illustrated in FIG. 8, would be provided for the red, green and blue colors. In a specific example shown in FIG. 9, a red color is obtained. By providing a second system with a blue light source and a third system with a green light source, a three color projection system would be available. The three separate color images projected through the liquid crystal layers could then be combined by well known optical means to superimpose the three images. Representative video signals of the representative three colors would be provided to the separate control tubes for each color. The images could be projected simultaneously or sequentially onto a screen.

It is also possible to use the selective optical rotational properties of the liquid crystal. This can be accomplished simply by providing a polarizer between the source 97 and the control tube 103 and an analyzer between the control tube 103 and the screen 98.

Figure 10:
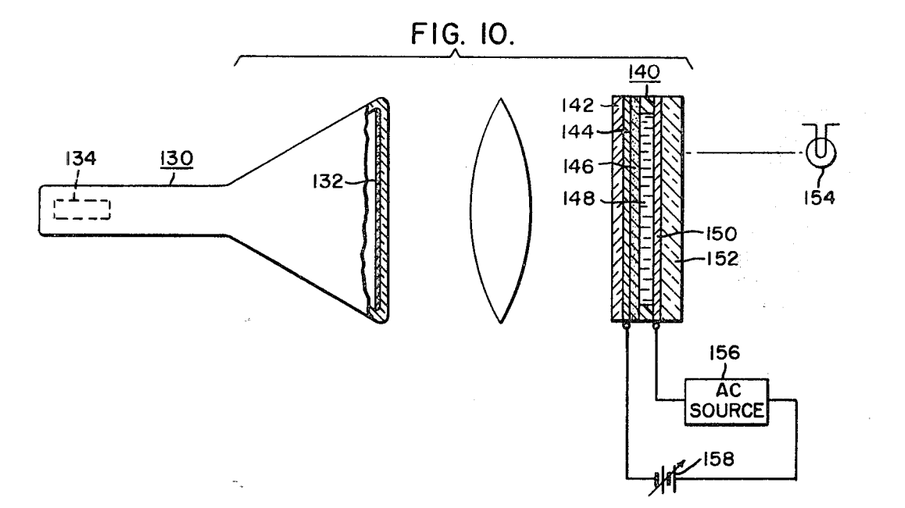
FIG. 10 is a view in sectional elevation of a color television system according to the teaching of my invention.

In FIG. 10, there is illustrated another arrangement for displaying a multicolor image by using the light-scattering properties of the liquid crystals. This device or arrangement consists of a flying spot scanner which is comprised of a substantially conventional type cathode-ray tube 130. The tube 130 includes an electron gun 134 and a phosphor screen 132 of a suitable material which in this application may be of a type which emits ultraviolet light in response to electron bombardment. Suitable deflection and scanning circuitry well known in the art may be utilized to scan a raster on the screen 132. The light generated by the cathode-ray tube 130 is projected through a suitable lens system 136 onto a liquid crystal control structure 140. The liquid crystal control structure 140 consists of a layer 142 of glass transmissive to the light from the cathode-ray tube 130, a layer of electrically conductive material 144 also transmissive to radiations from the cathode-ray tube 130, a layer 146 deposited on the conductive layer 144 of a suitable photoconductive material which exhibits the property of conduction in response to ultraviolet light excitation. A suitable material for the layer 146 is selenium. A liquid crystalline layer 148 is provided on the photoconductive layer 146 and may be of a suitable liquid crystalline materials as described with respect to FiG. 2 and which exhibits the properties as represented by FIGS. 3 and 4. On the opposite side of the layer 148, a layer 150 of electrically conductive material is provided transmissive to light directed onto the layer 148 from a source 154. The layer 150 may be of a suitable material such as stannic oxide. A glass support member 152 is provided on the exposed surface of the conductive layer 150. The light source 154 is provided for illuminating the liquid crystal layer 148 through the transmissive layers 150 and 152. The light source 154 should be of the type that emits white light. An alternating-current source 156 is connected across the two conductive layers 144 and 150. A direct-current potential source 158 is also provided in series with the source 156.

In the operation of the device, the cathode-ray tube 130 would project a blank raster through the layers 142 and 144 and excite the photoconductive layer 146 causing it to become conductive. This would, in turn, permit the voltage from the source 156 to be applied primarily across the liquid crystal layer 148 and by varying the amplitude of the source 156, the overall color of the screen could be varied. Thus, using liquid crystal materials that follow or respond at 90 cycles per second, three frames may be projected each lasting a 30th of a second with a different color set by the level of the bias provided by the direct-current voltage source 158. This would provide in effect a field sequential type color display. In the operation of the device, the light from the cathode-ray tube 130 would cause the photoconductive layer 146 to become conductive. The application of a suitable DC potential from the voltage source 158 across the liquid crystal layer 148 would cause the layer 148 to scatter red, green or blue and the particular color selected would be modulated with video intelligence by the source 156 to modulate the intensity of the relative colors. For this particular application, it would be advisable to utilize a light source 154 in which the source provides maximum intensities in three bands namely red, green and blue, each about 200 angstroms in width or by providing filters in with a white light source to provide a black background.

The arrangement could also be operated with a video intelligence applied across the two conductive layers 144 and 150 such that the video signal would include both a DC component to change the selective scattering of the liquid crystal layer 148 from red, green or blue and also provide an AC component which includes the necessary video intelligence for the color. In this manner, the color from the screen could be changed on a line-to-line basis or element-to-element if so desired. It is also possible to apply a suitable signal to the liquid crystal layer 148 to determine the proper color and utilize or apply video information to the cathode-ray tube 130 to modulate the conductivity of the photoconductor in accordance with the intensity of the particular color at that instant.

While there has been shown and described what are at present considered to be the preferred embodiments of the invention, modifications thereto will readily occur to those skilled in the art. For example, a piezoelectric layer of a suitable material such as barium titanate may be used to generate the electric field necessary to activate the liquid crystal layer. In this manner, sound or other mechanical energy may be detected and converted to a visible pattern. It is not desired, therefore, that the invention be limited to the specific arrangement shown and described and it is intended to cover in the appended claims all such modification as fall within the true spirit and scope of the invention.

I claim as my invention:

1. A method of detecting an unknown electric field comprising the steps of providing a cholesteric liquid crystalline material, subjecting said cholesteric liquid crystalline material to said unknown electric field and observing a change in the optical properties of said cholesteric liquid crystalline material in response to the presence of said unknown electric field.

2. A method of detecting an electric field comprising the steps of providing a thin film of cholesteric liquid crystalline material exhibiting the property of different values of selective scattering of light in response to different values of electric field, subjecting said thin film to said electric field, illuminating said thin film with white light to provide a color indication for different values of electric field.

3. A method of detecting an electric field comprising the steps of providing a thin film of a cholesteric liquid crystalline material exhibiting the property of change in optical properties in response to an electric field, subjecting said thin film to said electric field, illuminating said thin film with electromagnetic radiations to provide means for detecting the optical properties of said thin film in response to said electric field.

4. A method of detecting an unknown electric field comprising the steps of providing a thin film of a material having a cholesteric liquid crystalline phase, impressing said unknown electric field across said thin film and observing color change of said thin film in response to the presence of said unknown electric field.

5. A method of detecting an unknown electric potential comprising the steps of providing a thin film of a material having a cholesteric liquid crystalline phase, impressing said unknown electric potential across thin film and to modify the selective scattering properties of said thin film to visually indicate a color change.

6. A method of modulating a light source comprising the steps of providing a thin film of a material having a cholesteric liquid crystalline phase, directing the radiation from said light source onto said thin film, impressing an electric quality across said thin film to vary the optical properties of said thin film and modulate the light directed onto said thin film from said light source.

7. In combination, a layer of cholesteric liquid crystalline material exhibiting the property of change in the optical properties in response to an electric field, a first and second electrically conductive member for impressing a field across said layer of cholesteric liquid crystalline material, said first electrically conductive member transmissive to output radiations and means for directing said input radiations through said first electrically conductive member onto said thin film of cholesteric liquid crystalline material.

8. In combination, a thin film of cholesteric liquid crystalline material exhibiting different optical properties to different electric fields, a first and second electrical conductive member for impressing a field across said thin film of cholesteric liquid crystalline material, said first electrically conductive member being transmissive to light and means for input radiations directed through said first electrically conductive member onto said thin film of cholesteric liquid crystalline material to provide a visual indication of the optical property of said thin film.

9. In combination, a thin film of cholesteric liquid crystalline material exhibiting the property of selective scattering of light and of a first wavelength region in response to a first electric field and a second wavelength region in response to a second electric field, a first and second electrical conductive member for impressing a field across said thin film of cholesteric liquid crystalline material, said first electrically conductive member being transmissive to input radiations within said first and second wavelength regions, and means directing input radiations including said first and second wavelength regions through said transmissive member onto said thin film of cholesteric liquid crystalline material.

10. An article for detecting an electric field comprising a thin film of cholesteric liquid crystalline material and means for impressing said electric field there across.

11. An optical apparatus for controlling light within a discrete range of wavelengths of the light spectrum comprising a layer of cholesteric liquid crystalline material and means responsive to an electrical signal for impressing an electrical field across said layer.

12. A light-controlling device responsive to an electric field impressed thereacross comprising a thin film of a cholesteric liquid crystalline material that exhibits the property of selective scattering of radiations directed thereon, means for subjecting said thin film to an electric field to modify the dominant wavelength of the radiation scattering properties of said thin film and means for directing radiations from a source onto said thin film to provide scattering of selective wavelengths of radiations with the spectrum of said source.

13. An optical apparatus for controlling radiations within a selected range of wavelengths of the spectrum comprising a layer of cholesteric liquid crystalline material, said layer including 15 to 50 percent by weight of at least one material selected from the group consisting of cholesterol, cholesteryl chloride, cholesteryl bromide, cholesteryl iodide, cholestanol, cholestanyl chloride, cholestanyl bromide, cholestanyl iodide, sitosterol, sitosteryl chloride, sitosteryl bromine and sitosteryl iodide and electrically conductive means to impress a field across said layer.

14. An optical apparatus for controlling light within a selected range of wavelengths of the spectrum comprising a layer of cholesteric liquid crystalline material, said layer comprising 15 to 50 percent by weight of at least one material selected from the group consisting of cholesterol, cholesteryl chloride, cholesteryl iodide, cholesteryl bromide, cholestanol, cholestanyl chloride, cholestanyl bromide, cholestanyl iodide, sitosterol. sitosteryl chloride, sitosteryl bromide, sitosteryl iodine, and the balance including sterol derivatives and up to 20 percent of fatty acids and compounds thereof, and means for impressing an electric field across said layer for varying the optical properties of said layer.

15. An optical apparatus for controlling radiations comprising a layer of liquid crystalline material of the cholesteric phase including at least one material selected from the group consisting of cholesterol, cholestanol, sitostanol, cholesteryl halide, cholestanyl halide and sitosteryl halide and electrically conductive means for impressing an electric field across said layer.

16. A color television system comprising a thin film of a material having a cholesteric liquid crystalline phase, said film exhibiting a optical property of having a different dominant wave of selected scattering in the red, blue and green portions of the spectrum in response to different values of electric field applied thereto.

17. A projection system comprising a thin film of a material having a cholesteric liquid crystalline phase and exhibiting the property of different values of selective transmission of light in response to an electric field supplied thereacross, means for directing light from a source onto said liquid crystalline film, means for impressing different values of electric field across said liquid crystalline film for varying the transmission properties thereof and a screen member onto which a light image is projected through said liquid crystalline film from said source.

18. A method of detecting an electric field comprising the steps of providing a thin film of material containing a cholesteric liquid crystalline material, subjecting said film of material to said electric field and illuminating said film of material with light to provide a color indication for different values of electric field.

19. In combination, a layer of material containing a material in the cholesteric liquid crystalline phase exhibiting the property of changing optical properties in response to an electric field, a first and second electrically conductive member for impressing a field across said layer of material, said first electrically conductive member transmissive to input radiation and means for directing said input radiations through said first electrically conductive member onto said film of material.

20. An optical apparatus for controlling light within a discreet range of wavelengths of the light spectrum comprising a layer of material containing cholesterol nonanoate and means responsive to an electrical signal for impressing an electrical field across said layer.

\* \* \* \* \*